US009093733B2

(12) United States Patent
Suenaga et al.

(10) Patent No.: US 9,093,733 B2
(45) Date of Patent: Jul. 28, 2015

(54) SIGNAL TRANSMISSION DEVICE, SIGNAL TRANSMISSION SYSTEM, SIGNAL TRANSMISSION METHOD, AND COMPUTER DEVICE

(71) Applicant: Panasonic Intellectual Property Management Co., Ltd., Osaka (JP)

(72) Inventors: Hiroshi Suenaga, Osaka (JP); Yutaka Taguchi, Osaka (JP); Atsushi Shinkai, Fukui (JP); Takaharu Yoshida, Osaka (JP); Osamu Shibata, Hyogo (JP); Chie Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/623,113

(22) Filed: Feb. 16, 2015

(65) Prior Publication Data

US 2015/0162654 A1     Jun. 11, 2015

Related U.S. Application Data

(63) Continuation of application No. PCT/JP2014/000893, filed on Feb. 21, 2014.

(30) Foreign Application Priority Data

Apr. 26, 2013   (JP) .................................. 2013-093421

(51) Int. Cl.
*H03K 19/094* (2006.01)
*H01P 1/16* (2006.01)
*H01P 3/02* (2006.01)

(52) U.S. Cl.
CPC ... *H01P 1/16* (2013.01); *H01P 3/02* (2013.01)

(58) Field of Classification Search
None
See application file for complete search history.

(56) References Cited

U.S. PATENT DOCUMENTS 6,791,371 B1 *  9/2004  Cheung ........................... 327/63
6,836,290 B1   12/2004  Chung et al.
7,012,450 B1 *  3/2006  Oner et al. ...................... 326/86

(Continued)

FOREIGN PATENT DOCUMENTS

JP    2004-088693    3/2004
JP    2007-325156    12/2007

(Continued)

OTHER PUBLICATIONS

International Search Report of PCT application No. PCT/JP2014/000893 dated Mar. 18, 2014.

*Primary Examiner* — Crystal L Hammond
(74) *Attorney, Agent, or Firm* — Wenderoth, Lind & Ponack, L.L.P.

(57) ABSTRACT

A signal transmission device includes a differential driver, a first single-ended driver circuit block, a second single-ended driver circuit block, a control circuit, and a common-mode filter. In the case where two-channel single-ended transmission is performed by using the first and second single-ended driver circuit blocks, the control circuit controls a driving capability of the first single-ended driver circuit block and a driving capability of the second single-ended driver circuit block in accordance with a combination of a change in a logical value of an output signal of the first single-ended driver circuit block and a change in a logical value of an output signal of the second single-ended driver circuit block.

7 Claims, 8 Drawing Sheets

(56) References Cited

U.S. PATENT DOCUMENTS

| | | | |
|---|---|---|---|
| 7,330,514 B1 * | 2/2008 | Ahmad | 375/285 |
| 7,956,704 B1 * | 6/2011 | Acimovic | 333/181 |
| 8,446,173 B1 * | 5/2013 | Faucher et al. | 326/86 |
| 2004/0113656 A1 | 6/2004 | Sato | |
| 2005/0040846 A1 * | 2/2005 | Otsuka et al. | 326/31 |
| 2006/0290377 A1 * | 12/2006 | Kim et al. | 326/30 |
| 2007/0109019 A1 * | 5/2007 | Wu et al. | 326/82 |
| 2009/0239559 A1 * | 9/2009 | Hollis | 455/500 |
| 2011/0279167 A1 | 11/2011 | Fukuzumi et al. | |
| 2011/0292977 A1 * | 12/2011 | Farjadrad | 375/220 |
| 2011/0293041 A1 * | 12/2011 | Luo et al. | 375/316 |
| 2012/0146686 A1 * | 6/2012 | Maarouf | 326/30 |
| 2013/0114657 A1 | 5/2013 | Shibata et al. | |

FOREIGN PATENT DOCUMENTS

| | | |
|---|---|---|
| JP | 2011-239225 | 11/2011 |
| WO | 2012/114672 | 8/2012 |

* cited by examiner

| CONDITIONS | DrvStr1 | DrvStr2 |
|---|---|---|
| $FF_{A1} = FF_{B1}$ AND $FF_{A2} = FF_{B2}$ AND $FF_{A1} \neq FF_{A2}$ | 10b | |
| $FF_{A1} \neq FF_{A2}$ AND $FF_{B1} = FF_{B2}$ | 01b | 00b |
| $FF_{A1} = FF_{A2}$ AND $FF_{B1} \neq FF_{B2}$ | 00b | 01b |
| $FF_{A1} \neq FF_{A2}$ AND $FF_{B1} \neq FF_{B2}$ AND $FF_{A1} \neq FF_{B1}$, OR $FF_{A1} = FF_{A2}$ AND $FF_{B1} = FF_{B2}$ | 00b | |

SIGNAL TRANSMISSION DEVICE, SIGNAL TRANSMISSION SYSTEM, SIGNAL TRANSMISSION METHOD, AND COMPUTER DEVICE

BACKGROUND

1. Technical Field

The present disclosure relates to a signal transmission device, a signal transmission system including the signal transmission device, signal transmission method, and computer device.

2. Description of the Related Art

U.S. Pat. No. 6,836,290 discloses a configuration in which a differential driver and two single-ended drivers are connected to two transmission lines.

Japanese Patent No. 3730607 discloses a pre-emphasis technique for enhancing a signal driving capability over a signal-level transition period, that is, a period over which the signal rises or falls.

SUMMARY

Exemplary embodiments of the present disclosure relate to a signal transmission device in which transmission lines are shared among a differential driver and single-ended driver circuit blocks and in which a common-mode filter is provided at the transmission lines, and provide a technique for suppressing degradation in the quality of single-ended signals.

In one aspect of the present disclosure, a signal transmission device includes a first transmission line, a second transmission line, a differential driver having an in-phase output terminal and an antiphase output terminal, a first single-ended driver circuit block having an output terminal, a second single-ended driver circuit block having an output terminal, a control circuit, and a common-mode filter. The in-phase output terminal of the differential driver and the output terminal of the first single-ended driver circuit block are connected to the first transmission line via the common-mode filter. The antiphase output terminal of the differential driver and the output terminal of the second single-ended driver circuit block are connected to the second transmission line via the common-mode filter. The control circuit controls, in a case where two-channel single-ended transmission is performed using the first single-ended driver circuit block and the second single-ended driver circuit block, a driving capability of the first single-ended driver circuit block and a driving capability of the second single-ended driver circuit block in accordance with a combination of a change in a logical value of an output signal of the first single-ended driver circuit block and a change in a logical value of an output signal of the second single-ended driver circuit block.

It should be noted that general or specific embodiments may be implemented as a device, an apparatus, a system, a method, an integrated circuit, a computer program, storage media, or any elective combination thereof.

According to exemplary embodiments of the present disclosure, in the case where transmission lines are used both for differential transmission and single-ended transmission and a common-mode filter is included, the quality of signal waveforms can be maintained at a satisfactory level and unwanted electromagnetic radiation can be suppressed during differential transmission and the quality of signal waveforms can be maintained at a satisfactory level during two-channel single-ended transmission.

Additional benefits and advantages of the disclosed embodiments will be apparent from the specification and Figures. The benefits and/or advantages may be individually provided by the various embodiments and features of the specification and Figures, and need not all be provided in order to obtain one or more of the same.

DETAILED DESCRIPTION OF THE EMBODIMENTS

Figure 1:
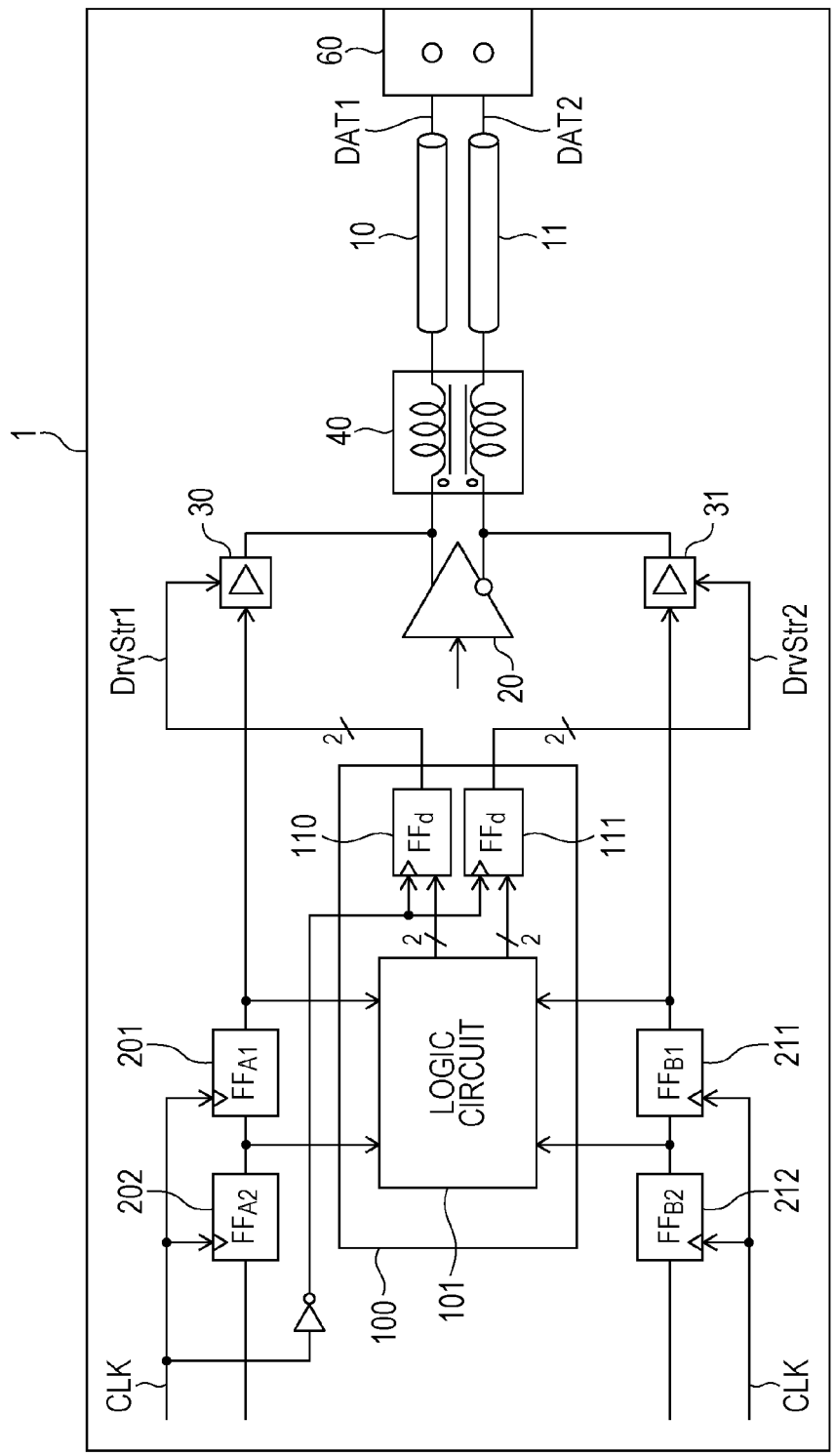
FIG. 1 is a configuration diagram of a signal transmission device according to a first embodiment.

The inventors of the subject application have found that a common-mode filter connected to transmission lines that are shared among a differential driver and single-ended driver circuit blocks causes an issue in signal waveforms when the single-ended driver circuit blocks drive the transmission lines.

A common-mode filter suppresses transmission of a common-mode component that can be a cause of unwanted electromagnetic radiation, almost without influencing transmission of a differential component which is a main component of a differential signal. Thus, a common-mode filter is a filter component that is effective for differential transmission. However, in the case where two single-ended signals are input to a common-mode filter, the two single-ended signals do not necessarily have signal waveforms of opposite phases. That is, there are cases where both the two single-ended signals remain unchanged, where the two single-ended signals change in the opposite directions, where one of the two single-ended signals remains unchanged and the other single-ended signal alone changes, and where the two single-ended signals change in the same directions.

How much the two single-ended signals are influenced by the common-mode filter varies from case to case. In exemplary embodiments of the present disclosure, this point is focused on.

A first aspect of the present disclosure provides a signal transmission device including a first transmission line, a second transmission line, a differential driver having an in-phase output terminal and an antiphase output terminal, a first single-ended driver circuit block having an output terminal, a second single-ended driver circuit block having an output terminal, a control circuit, and a common-mode filter. The in-phase output terminal of the differential driver and the output terminal of the first single-ended driver circuit block are connected to the first transmission line via the common-mode filter. The antiphase output terminal of the differential driver and the output terminal of the second single-ended driver circuit block are connected to the second transmission line via the common-mode filter. The control circuit is configured to control, in a case where two-channel single-ended transmission is performed using the first single-ended driver circuit block and the second single-ended driver circuit block, a driving capability of the first single-ended driver circuit block and a driving capability of the second single-ended driver circuit block in accordance with a combination of a change in a logical value of an output signal of the first single-ended driver circuit block and a change in a logical value of an output signal of the second single-ended driver circuit block.

According to the first aspect, the quality of signal waveforms can be maintained at a satisfactory level and unwanted electromagnetic radiation can be suppressed during differential transmission. In addition, the quality of signal waveforms can also be maintained at a satisfactory level during two-channel single-ended transmission.

In a second aspect of the present disclosure, according to the first aspect, for example, the control circuit may make, in a case (a) where the logical value of the output signal of one single-ended driver circuit block among the first and second single-ended driver circuit blocks changes and the logical value of the output signal of the other single-ended driver circuit block remains unchanged, a driving capability of the one single-ended driver circuit block higher than driving capabilities of the first and second single-ended driver circuit blocks in each of a case (b) where both the logical values of the output signals of the first and second single-ended driver circuit blocks remain unchanged and a case (c) where the logical values of the output signals of the first and second single-ended driver circuit blocks change in opposite directions, and make, in a case (d) where the logical values of the output signals of the first and second single-ended driver circuit blocks change in identical directions, driving capabilities of the first and second single-ended driver circuit blocks higher than driving capabilities of the first and second single-ended driver circuit blocks in the case (a).

According to the second aspect, the driving capabilities of the first and second single-ended driver circuit blocks are appropriately controlled in accordance with a degree to which the two single-ended signals are influenced by the common-mode filter.

In a third aspect of the present disclosure, according to the first or second aspect, for example, each of the first and second single-ended driver circuit blocks may include a plurality of single-ended drivers having different driving capabilities, and the control circuit may output a signal to select one or more single-ended driver to be driven from among the plurality of single-ended drivers.

According to the third aspect, the driving capabilities of the first and second single-ended driver circuit blocks are controlled by selecting the driving capability of the corresponding single-ended driver.

In a fourth aspect of the present disclosure, according to the first or second aspect, for example, each of the first and second single-ended driver circuit blocks may include a single-ended driver having an output terminal, and a plurality of resistor circuits having different resistance values and connected to the output terminal of the single-ended driver, and the control circuit output a signal to select one or more resistor circuit to be driven from among the plurality of resistor circuits.

According to the fourth aspect, the driving capabilities of the first and second single-ended driver circuit blocks are controlled by selecting a resistance value of the corresponding resistor circuit.

A fifth aspect of the present disclosure provides a signal transmission system including a master device that is the signal transmission device according to any one of the first to fourth aspects and a slave device connected to the master device via the first and second transmission lines, wherein the master device instructs, before two-channel single-ended transmission is performed from the slave device to the master device via the first and second transmission lines, the slave device to control driving capabilities of drivers for respective channels in accordance with a combination of changes in logical values of single-ended signals output to the respective channels by the slave device.

According to the fifth aspect, benefits similar to those obtained in two-channel single-ended transmission from the master device to the slave device can be obtained in two-channel single-ended transmission from the slave device to the master device.

A sixth aspect of the present disclosure provides a computer device comprising the signal transmission device according to any one of the first to fourth aspects to exchange data with another device.

According to the sixth aspect, the quality of signal waveforms is improved when data is exchanged by the computer device.

A seventh aspect of the present disclosure provides a signal transmission method for a signal transmission device including a first transmission line, a second transmission line, a differential driver including an in-phase output terminal and an antiphase output terminal, a first single-ended driver circuit block including an output terminal, a second single-ended driver circuit block including an output terminal, a control circuit, and a common-mode filter, the in-phase output terminal of the differential driver and the output terminal of the first single-ended driver circuit block being connected to the first transmission line via the common-mode filter, the antiphase output terminal of the differential driver and the output terminal of the second single-ended driver circuit block being connected to the second transmission line via the common-mode filter. The signal transmission method includes controlling, with the control circuit, a driving capability of the first single-ended driver circuit block and a driving capability of the second single-ended driver circuit block in accordance with a combination of a change in a logical value of an output signal of the first single-ended driver circuit block and a change in a logical value of an output signal of the second single-ended driver circuit block; and performing two-channel single-ended transmission by using the first single-ended driver circuit block and the second single-ended driver circuit block.

According to the seventh aspect, the quality of signal waveforms can be maintained at a satisfactory level and unwanted electromagnetic radiation can be suppressed during differential transmission. In addition, the quality of signal waveforms can also be maintained at a satisfactory level during two-channel single-ended transmission.

Embodiments will be described below with reference to the accompanying drawings.

First Embodiment

FIG. 1 is a configuration diagram of a signal transmission device 1 according to a first embodiment. Referring to FIG. 1, a common-mode filter 40 is connected to two transmission lines 10 and 11 connected to a connector 60. Further, an in-phase output terminal and an antiphase output terminal of a differential driver 20 are respectively connected to the transmission lines 10 and 11 via the common-mode filter 40. In addition, a first single-ended driver circuit block 30 shares the transmission line 10 with the in-phase output terminal of the differential driver 20 and a second single-ended driver circuit block 31 shares the transmission line 11 with the antiphase output terminal of the differential driver 20.

Data holding circuits 201 and 202 each including a flip-flop or the like are connected to an input terminal of the first single-ended driver circuit block 30. A high level (H level) or low level (L level) signal based on output data is input to and held by each of the data holding circuits 201 and 202. The H level or L level signals held by the data holding circuits 201 and 202 are supplied to the first single-ended driver circuit block 30 in synchronization with a clock signal CLK, and an output signal based on the H or L levels is output to the transmission line 10 from the first single-ended driver circuit block 30. The second single-ended driver circuit block 31 and data holding circuits 211 and 212 provided upstream of the second single-ended driver circuit block 31 also have similar configurations and perform similar operations to the first single-ended driver circuit block 30 and the data holding circuits 201 and 202. Output driving capabilities of the first and second single-ended driver circuit blocks 30 and 31 are controlled by a control circuit 100.

Figures 2, 3:
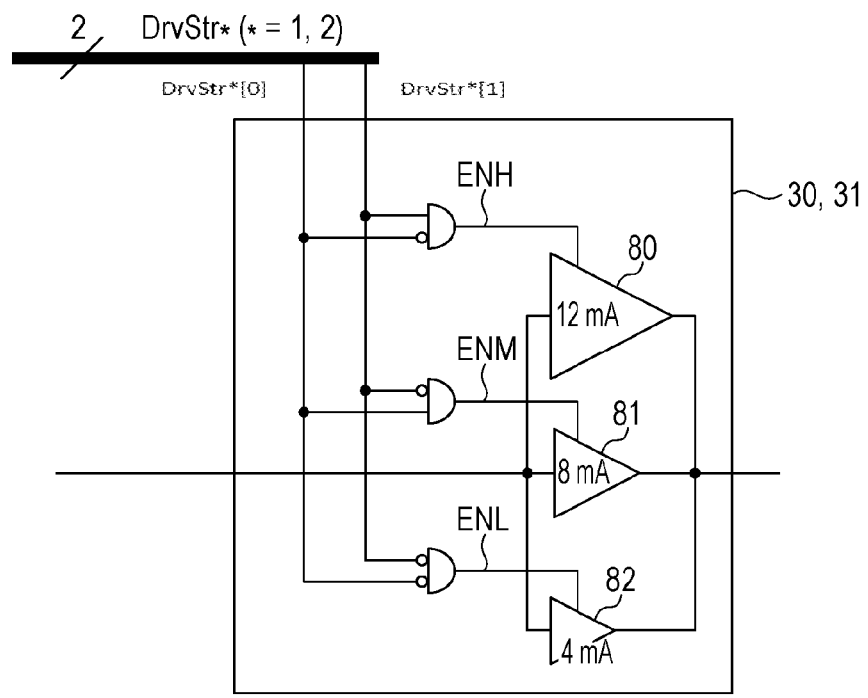
FIG. 2 is a diagram illustrating an example of operation conditions of a control circuit configured to control driving capabilities of single-ended driver circuit blocks illustrated in FIG. 1.
FIG. 3 is a circuit diagram illustrating an example of each of the single-ended driver circuit blocks illustrated in FIG. 1.

A logic circuit 101 included in the control circuit 100 determines a first control signal DrvStr1 and a second control signal DrvStr2 used to control output driving capabilities of the first and second single-ended driver circuit blocks 30 and 31, respectively, in accordance with conditions illustrated in FIG. 2, for example.

Specifically, in the case where two single-ended signals change in the same direction such as from the H level to the L level or from the L level from the H level, the two-bit first and second driving signals DrvStr1 and DrvStr2 are set to 10b (here, b indicates that the binary notation is used). Specifically, both the first control signal DrvStr1 and the second control signal DrvStr2 are set to 10b if the value (H/L) of the signal held by the data holding circuit 201 ($FF_{A1}$) is equal to the value (H/L) of the signal held by the data holding circuit 211 ($FF_{B1}$) and the value (H/L) of the signal held by the data holding circuit 202 ($FF_{A2}$) is equal to the value (H/L) of the signal held by the data holding circuit 212 ($FF_{B2}$) and the value (H/L) of the signal held by the data holding circuit 201 ($FF_{A1}$) is not equal to the value (H/L) of the signal held by the data holding circuit 202 ($FF_{A2}$) (i.e. if $FF_{A1}=FF_{B1}$ and $FF_{A2}=FF_{B2}$ and $FF_{A1} \neq FF_{A2}$).

In addition, in the case where the second single-ended signal remains unchanged and the first single-ended signal alone changes, the first control signal DrvStr1 is set to 01b and the second control signal DrvStr2 is set to 00b. Specifically, the first control signal DrvStr1 is set to 01b and the second control signal DrvStr2 is set to 00b if the value (H/L) of the signal held by the data holding circuit 201 ($FF_{A1}$) is not equal to the value (H/L) of the signal held by the data holding circuit 202 ($FF_{A2}$) and the value (H/L) of the signal held by the data holding circuit 211 ($FF_{B1}$) is equal to the value (H/L) of the signal held by the data holding circuit 212 ($FF_{B2}$) (i.e. if $FF_{A1} \neq FF_{A2}$ and $FF_{B1}=FF_{B2}$).

In addition, in the case where the first single-ended signal remains unchanged and the second single-ended signal alone changes, the first control signal DrvStr1 is set to 00b and the second control signal DrvStr2 is set to 01b. Specifically, the first control signal DrvStr1 is set to 00b and the second control signal DrvStr2 is set to 01b if the value (H/L) of the signal held by the data holding circuit 201 ($FF_{A1}$) is equal to the value (H/L) of the signal held by the data holding circuit 202 ($FF_{A2}$) and the value (H/L) of the signal held by the data holding circuit 211 ($FF_{B1}$) is not equal to the value (H/L) of the signal held by the data holding circuit 212 ($FF_{B2}$) (i.e. if $FF_{A1}=FF_{A2}$ and $FF_{B1} \neq FF_{B2}$).

Further, in the case where the first and second single-ended signals change in the opposite directions or where both the first and second single-ended signals remain unchanged, both the two-bit first and second control signals DrvStr1 and DrvStr2 are set to 00b. Specifically, the first control signal DrvStr1 is set to 00b and the second control signal DrvStr2 is set to 00b if the value (H/L) of the signal held by the data holding circuit 201 ($FF_{A1}$) is not equal to the value (H/L) of the signal held by the data holding circuit 202 ($FF_{A2}$) and the value (H/L) of the signal held by the data holding circuit 211 ($FF_{B1}$) is not equal to the value (H/L) of the signal held by the data holding circuit 212 ($FF_{B2}$) and the value (H/L) of the signal held by the data holding circuit 201 ($FF_{A1}$) is not equal to the value (H/L) of the signal held by the data holding circuit 211 ($FF_{B1}$) (i.e. if $FF_{A1} \neq FF_{A2}$ and $FF_{B1} \neq FF_{B2}$ and $FF_{A1} \neq FF_{B1}$). In addition, the first control signal DrvStr1 is set to 00b and the second control signal DrvStr2 is set to 00b if the value (H/L) of the signal held by the data holding circuit 201 ($FF_{A1}$) is equal to the value (H/L) of the signal held by the data holding circuit 202 ($FF_{A2}$) and the value (H/L) of the signal held by the data holding circuit 211 ($FF_{B1}$) is equal to the value (H/L) of the signal held by the data holding circuit 212 ($FF_{B2}$) (i.e. if $FF_{A1}=FF_{A2}$ and $FF_{B1}=FF_{B2}$).

As described above, each of the first driving signal DrvStr1 and the second driving signal DrvStr2 can take values of 00b, 01b, and 10b. The value 00b corresponds to a low output driving capability, the value 01b corresponds to an intermediate output driving capability higher than the low one, and the value 10b corresponds to a high output driving capability higher than the intermediate one.

The control circuit 100 is configured such that data holding circuits ($FF_d$) 110 and 111 respectively hold the first and second control signals DrvStr1 and DrvStr2 on the falling edge of the clock signal CLK in order to achieve intended output driving capabilities when the output signals of the first and second single-ended driver circuit blocks 30 and 31 change. With this configuration, the output driving capabilities can be changed a half a cycle earlier than the timing at which the output signals of the first and second single-ended driver circuit blocks 30 and 31 change. Consequently, signals can be output using the intended output driving capabilities at the timing at which the output signals change.

Each of the first and second single-ended driver circuit blocks 30 and 31 has a configuration illustrated in FIG. 3, for example, and dynamically switches between driving capabilities of single-ended drivers 80, 81, and 82 in accordance with the corresponding one of the first control signal DrvStr1 and the second control signal DrvStr2. Specifically, in the case where the first control signal DrvStr1 or the second control signal DrvStr2 is equal to 10b, a first enable signal ENH becomes high (H) and the single-ended driver 80 having the highest output driving capability is selected. In the case where the first control signal DrvStr1 or the second control signal DrvStr2 is equal to 01b, a second enable signal ENM becomes high (H) and the single-ended driver 81 having an intermediate output driving capability is selected. In the case where the first control signal DrvStr1 or the second control signal DrvStr2 is equal to 00b, a third enable signal ENL becomes high (H) and the single-ended driver 82 having the lowest output driving capability is selected.

Figure 4:
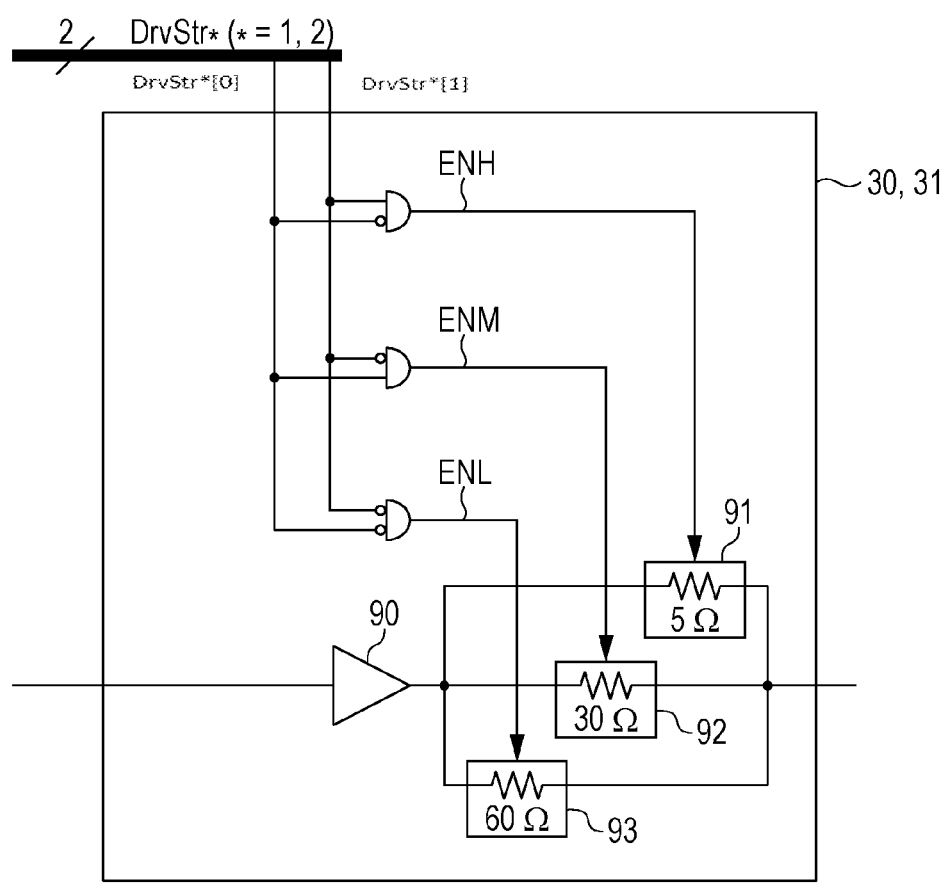
FIG. 4 is a circuit diagram illustrating another example of each of the single-ended driver circuit blocks illustrated in FIG. 1.

Each of the first and second single-ended driver circuit blocks 30 and 31 may have a configuration illustrated in FIG. 4. That is, a plurality of resistor circuits 91, 92, and 93 having different resistance values and arranged downstream of the output stage of a single-ended driver 90 are dynamically selected in the configuration illustrated in FIG. 4, whereas the plurality of single-ended drivers 80 to 82 having different driving capabilities are dynamically controlled in the configuration illustrated in FIG. 3. Specifically, in the case where the first control signal DrvStr1 or the second control signal DrvStr2 is equal to 10b, the first enable signal ENH becomes high (H) and the resistor circuit 91 having the smallest resistance value is selected. In the case where the first control signal DrvStr1 or the second control signal DrvStr2 is equal to 01b, the second enable signal ENM becomes high (H) and the resistor circuit 92 having an intermediate resistance value is selected. In the case where the first control signal DrvStr1 or the second control signal DrvStr2 is equal to 00b, the third enable signal ENL becomes high (H) and the resistor circuit 93 having the largest resistance value is selected. The resistor circuits 91, 92, and 93 illustrated in FIG. 4 may be implemented using, for example, polysilicon resistors or on-resistance of transistors so that functions thereof can be turned ON and OFF using the enable signals.

Figure 5:
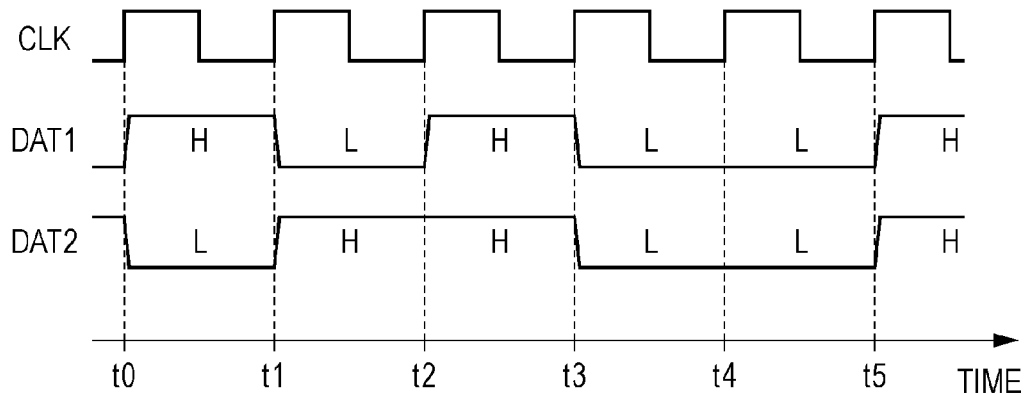
FIG. 5 is a diagram illustrating examples of waveforms of single-ended signals in the case where a signal transmission device that has a same structure as illustrated in FIG. 1 except not having a common-mode filter on transmission lines.

FIG. 5 illustrates transmission waveforms of two single-ended signals DAT1 and DAT2 which are transmitted in synchronization with the rising edge of the clock signal CLK without via the common-mode filter 40. Because the common-mode filter 40 is not used, a gradient at the rising or falling of each of the two single-ended signals DAT1 and DAT2 is not dependent on a change in the other single-ended signal.

Figure 6:
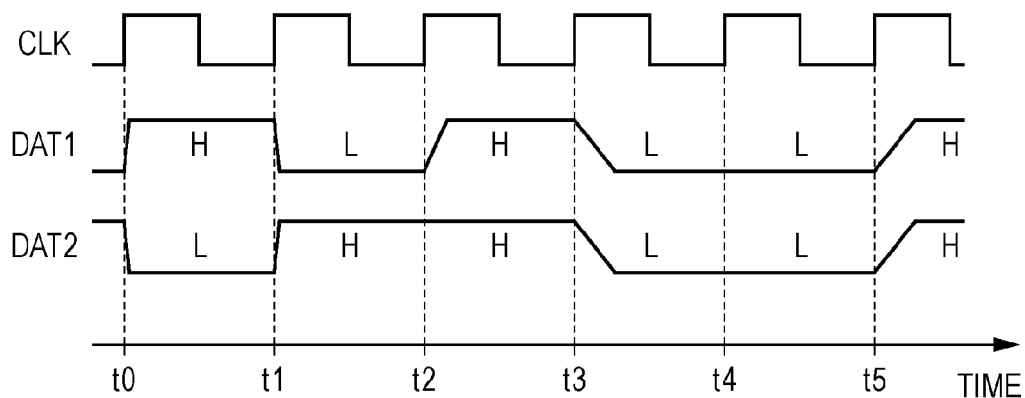
FIG. 6 is a diagram illustrating that waveforms of single-ended signals deteriorate in the case where a signal transmission device that has a same structure as illustrated in FIG. 1 except not having a function for controlling the driving capabilities of single-ended drivers.

FIG. 6 illustrates signal waveforms of the two single-ended signals DAT1 and DAT2 obtained in the case where the common-mode filter 40 is connected to the transmission lines 10 and 11. Note that the driving capabilities of the single-ended drivers are not controlled here. In this case, when the two single-ended signals DAT1 and DAT2 change in the opposite directions (at t0 and t1), a large impedance is not produced by the common-mode filter 40. Thus, waveforms of the two single-ended signals DAT1 and DAT2 are not distorted on the rising edge and the falling edge. In contrast, when one of the two single-ended signals DAT1 and DAT2 changes (at t2), an impedance is produced by the common-mode filter 40 against the signal that changes. Thus, the waveform of the signal is distorted on the rising edge or the falling edge. Further, when the two single-ended signals DAT1 and DAT2 change in the same direction (at t3 and t5), an impedance produced by the common-mode filter 40 further increases. Thus, waveforms of the two single-ended signals DAT1 and DAT2 are further distorted on the rising edge and the falling edge. Because how much the waveforms of the signals to be received are distorted on the rising edge or the falling edge differs depending on a combination of changes in the two single-ended signals DAT1 and DAT2, a jitter component superimposed on the signal waveforms increases. As a result, it becomes difficult for a receiver that receives the two single-ended signals DAT1 and DAT2 to properly receive these signals.

Figure 7:
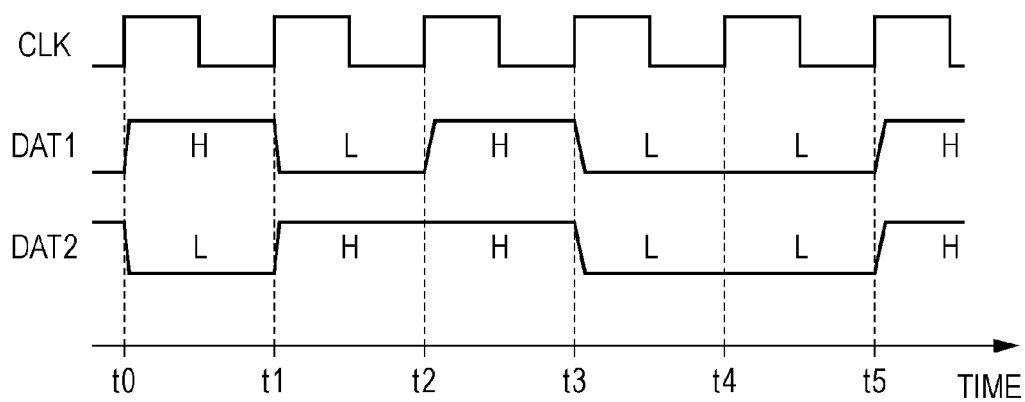
FIG. 7 is a diagram illustrating that the quality of waveforms of single-ended signals is improved as a result of the signal transmission device that is illustrated in FIG. 1.

With the configuration disclosed herein, however, the output driving capabilities of the first and second single-ended driver circuit blocks 30 and 31 are changed in accordance with the combination of changes in the two-channel single-ended signals DAT1 and DAT2. Thus, a distortion on the rising edge and the falling edge of the signal caused by the common-mode filter 40 can be corrected as illustrated in FIG. 7.

Figure 8:
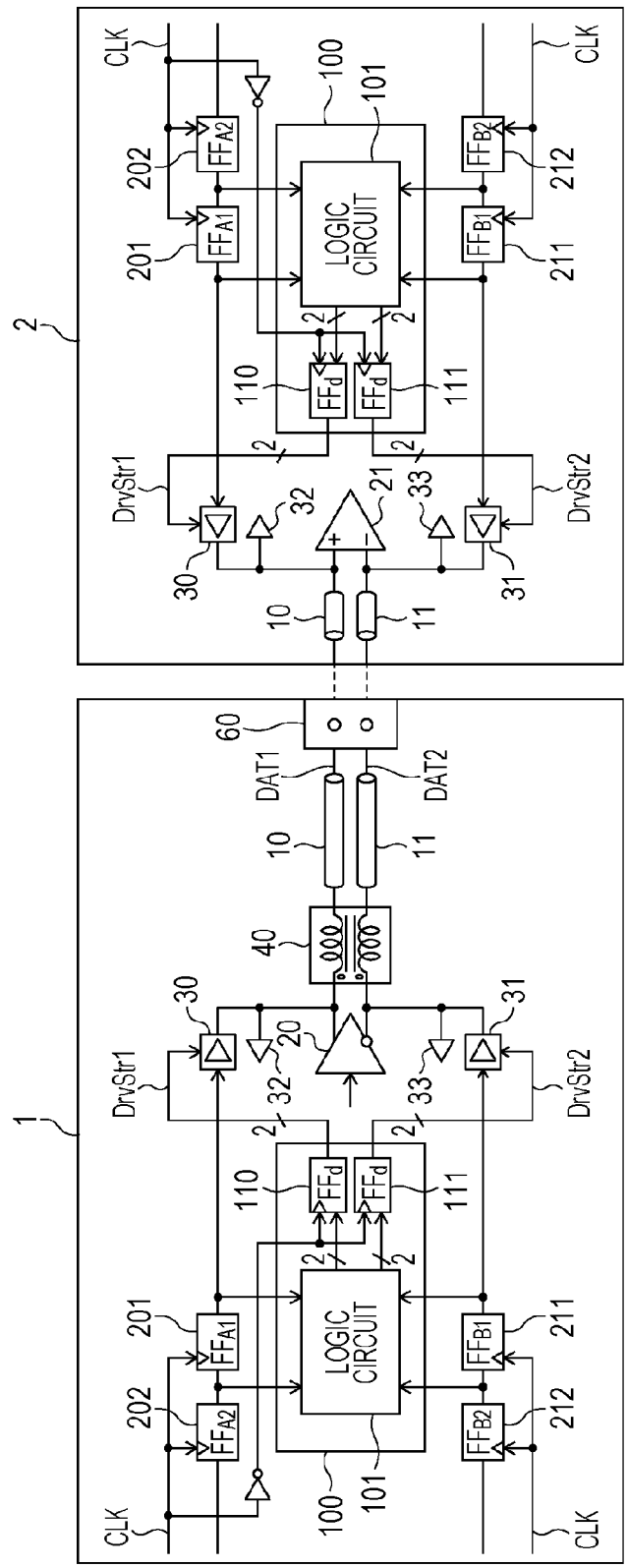
FIG. 8 is a configuration diagram of a signal transmission system including two signal transmission devices each having the basic configuration illustrated in FIG. 1.

As illustrated in FIG. 8, a signal transmission system can be constructed using the signal transmission device 1 according to embodiments of the present disclosure as a master and using another signal transmission device 2 as a slave. The signal transmission device 2 at the slave side (hereinafter, also referred to as the slave signal transmission device 2) includes a differential receiver 21 which corresponds to the differential driver 20 included in the signal transmission device 1 at the master side (hereinafter, also referred to as the master signal transmission device 1). In addition, each of the master and slave signal transmission devices 1 and 2 includes single-ended receivers 32 and 33 for two channels.

Figure 9:
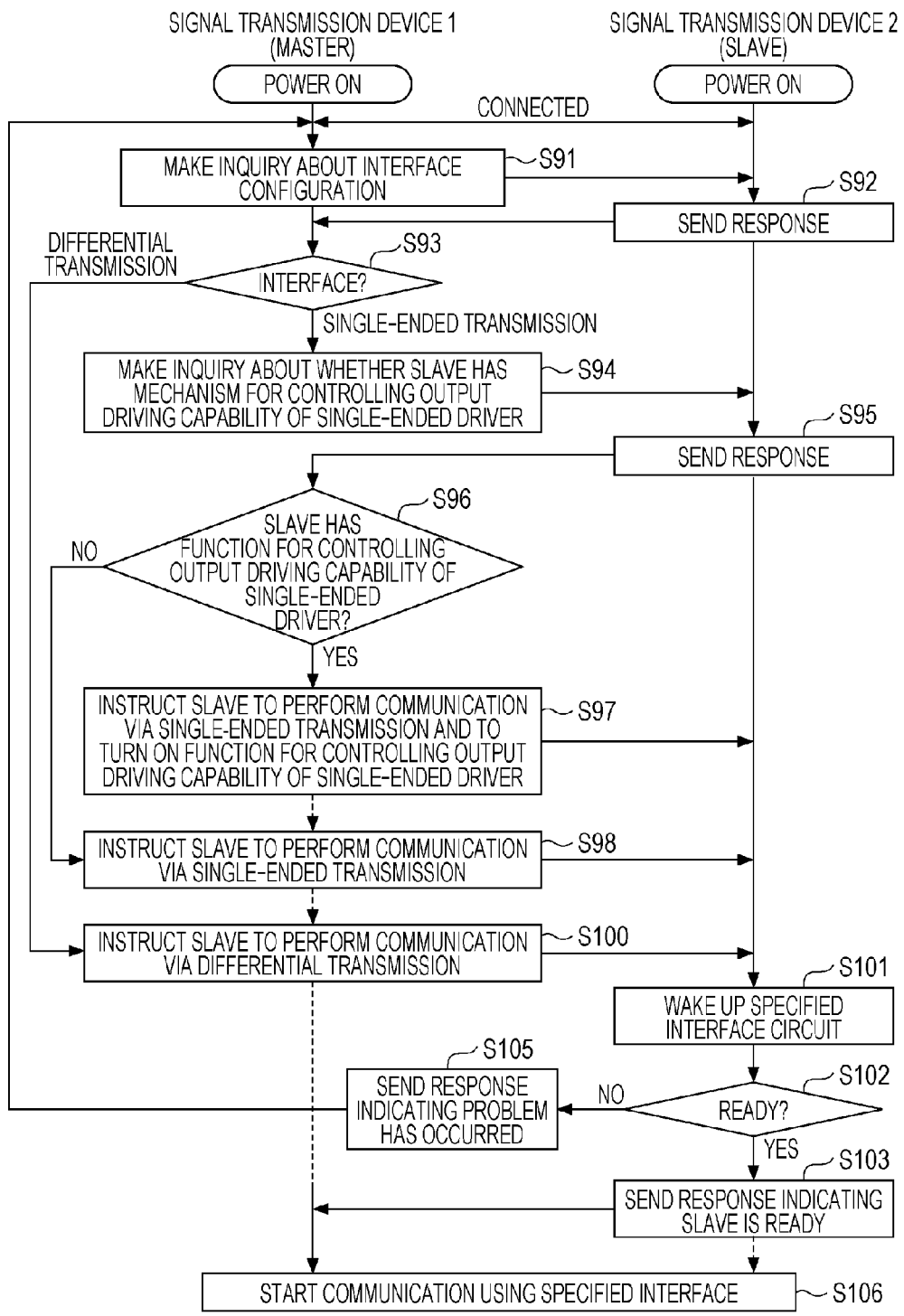
FIG. 9 is a flowchart illustrating an example of a procedure for selecting an interface in the signal transmission system illustrated in FIG. 8.

When communication is established, the master signal transmission device 1 can select an interface to be used for signal transmission in the slave signal transmission device 2 in accordance with a flow illustrated in FIG. 9, for example. Specifically, the master and slave signal transmission devices 1 and 2 are powered on first, and a control line is connected therebetween. Subsequently, the master signal transmission device 1 transmits an inquiry as to which of differential transmission and single-ended transmission is selected as the interface to be used, to the slave signal transmission device 2 using the connected control line (S91). Upon receipt of this inquiry, the slave signal transmission device 2 transmits a response indicating the selected one of differential transmission and single-ended transmission to the master signal transmission device 1 (S92). In accordance with this response, the master signal transmission device 1 determines which of differential transmission and single-ended transmission is selected (S93). If single-ended transmission is selected, the master signal transmission device 1 transmits an inquiry as to whether the slave signal transmission device 2 includes a mechanism for controlling the output driving capabilities of the single-ended drivers to the slave signal transmission device 2 (S94). In response to this inquiry, the slave signal transmission device 2 transmits a response to the master signal transmission device 1 (S95). In accordance with this response, the master signal transmission device 1 determines whether or not the slave signal transmission device 2 includes a mechanism for controlling the output driving capabilities of the single-ended drivers (S96). If it is determined that the slave signal transmission device 2 also includes a mechanism for controlling the output driving capabilities of the single-ended drivers as illustrated in FIG. 8 (YES in S96), the master signal transmission device 1 instructs the slave signal transmission device 2 that communication is to be performed from the slave signal transmission device 2 to the master signal transmission device 1 by using two-channel single-ended transmission and that the slave signal transmission device 2 controls the driving capabilities of the drivers for the respective channels in accordance with the combination of changes in logical values of the single-ended signals output to the respective channels by the slave signal transmission device 2 (S97).

In this way, not only single-ended signals transmitted to the slave signal transmission device 2 by the master signal transmission device 1 but also single-ended signals transmitted to the master signal transmission device 1 by the slave signal transmission device 2 can be received after a waveform distortion caused by the common-mode filter 40 has been corrected. Thus, the quality of signal waveforms of the transmission and reception signals is maintained at a satisfactory level.

If it is determined that the slave signal transmission device 2 does not include a mechanism for controlling the output driving capabilities of the single-ended drivers 30 and 31 (NO in step S96), the master signal transmission device 1 instructs the slave signal transmission device 2 that communication is to be performed from the slave signal transmission device 2 to the master signal transmission device 1 by using two-channel single-ended transmission (S98).

If differential transmission is selected in step S93, the master signal transmission device 1 instructs the salve signal transmission device 2 that communication is to be performed from the slave signal transmission device 2 to the master signal transmission device 1 by using differential transmission (S100).

Upon receipt of any one of these instructions, the slave signal transmission device 2 wakes up an interface circuit specified by the instruction (S101). Thereafter, the slave signal transmission device 2 determines whether or not preparation for communication has completed (S102). If preparation has completed (YES in S102), the slave signal transmission device 2 transmits a response indicating so to the master signal transmission device 1 (S103). In this way, communication is started between the master and slave signal transmission devices 1 and 2 by using the specified interface (S106). If a problem has occurred during preparation for communication (NO in step S102), the slave signal transmission device 2 transmits a response indicating so to the master signal transmission device 1 (S105). In this case, the process returns to step S91.

Second Embodiment

Figure 10:
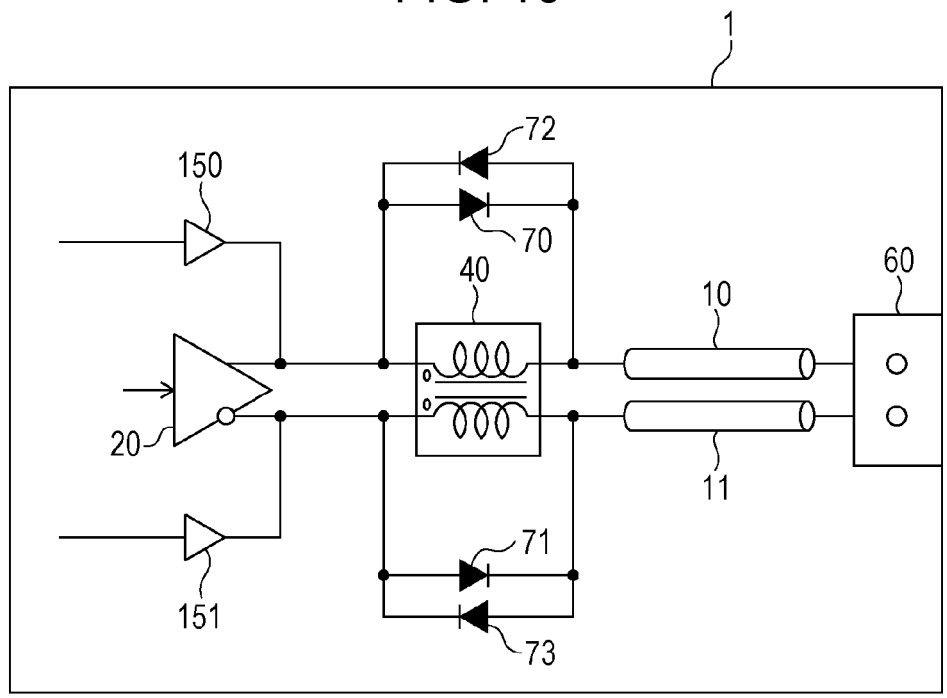
FIG. 10 is a configuration diagram of a signal transmission device according to a second embodiment.

FIG. 10 is a configuration diagram of the signal transmission device 1 according to a second embodiment. Referring to FIG. 10, the common-mode filter 40 is connected to the two transmission lines 10 and 11. Also, diodes 70 and 72 are connected in parallel to a pair of two pairs of an input terminal and an output terminal of the common-mode filter 40, and diodes 71 and 73 are connected in parallel to the other pair. Further, an in-phase output terminal and an antiphase output terminal of the differential driver 20 are respectively connected to the transmission lines 10 and 11 via the common-mode filter 40. In addition, a first single-ended driver 150 shares the transmission line 10 with the in-phase output terminal of the differential driver 20, and a second single-ended driver 151 shares the transmission line 11 with the antiphase output terminal of the differential driver 20.

The anode of the diode 70 is connected to the cathode of the diode 72 and the cathode of the diode 70 is connected to the anode of the diode 72. The diodes 71 and 73 are also connected in the same manner. Also, as the diodes 70 to 73, diodes having a forward-direction threshold voltage that is higher than a signal amplitude output by the differential driver 20 and is lower than a signal amplitude output by the first and second single-ended drivers 150 and 151 are used.

With the above-described configuration in which diodes 70 to 73 and the common-mode filter 40 are connected, one of the diodes 70 and 72 or one of the diodes 71 and 73 begins to conduct or does not conduct when the output signal level of the single-ended driver 150 or 151 changes (from L to H or from H to L) in the case where the signal transmission device 1 performs single-ended transmission. Thus, the degradation in the quality of the single-ended signals caused by the common-mode filter 40 can be suppressed.

In addition, in the case where the signal transmission device 1 performs differential transmission, the differential signal does not flow through the diodes elements 70 to 73 but can flow through the common-mode filter 40 as originally intended because the signal amplitude of the differential driver 20 is smaller than the forward-direction threshold voltage of the diodes 70 to 73.

An operation will be described in detail below by using the single-ended driver 150 by way of example.

First, in the case where the output of the single-ended driver 150 changes from the L level to the H level, a potential on the transmission line 10 is in an low (L) state and the single-ended driver 150 changes its output state from the L level to the H level. At this time, the potential at the anode of the diode element 70 changes to a high (H) potential and the potential at the cathode thereof is kept at a low (L) potential. Because the potential difference between the H potential and the L potential is larger than the forward-direction threshold voltage of the diode 70 as described above, the diode element 70 conducts. Consequently, the single-ended signal flows through the diode element 70, and thus a distortion of the signal waveform caused on the rising edge by the common-mode filter 40 can be reduced.

In the case where the output of the single-ended driver 150 changes from the H level to the L level, the potential on the transmission line 10 is in a high (H) state and the single-ended driver 150 changes its output state from the H level to the L level. At this time, the potential at the cathode of the diode element 72 changes to a low (L) potential and the potential at the anode thereof is kept at a high (H) potential. Because the potential difference between the H potential and the L potential is larger than the forward-direction threshold voltage of the diode element 72 as described above, the diode element 72 conducts. Consequently, the single-ended signal flows through the diode element 72, and thus a distortion of the signal waveform caused on the falling edge by the common-mode filter 40 can be reduced.

Operations of the single-ended driver 151 and the diodes 71 and 73 are similar to the above-described operations of the single-ended driver 150 and the diodes 70 and 72.

With the above-described configuration, in the case where the signal transmission device 1 performs two-channel single-ended transmission, a current flows through one of the diodes 70 and 72 or one of the diodes 71 and 73 when the output signal level of the single-ended driver 150 or 151 changes. Thus, a distortion at the rising or falling of the signal caused by the common-mode filter 40 can be suppressed.

Figure 11:
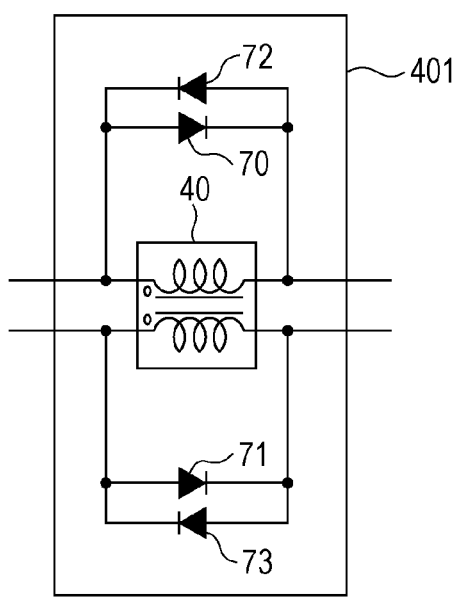
FIG. 11 is a configuration diagram of a filter component according to the second embodiment.

As illustrated in FIG. 11, the common-mode filter 40 and the diodes 70 to 73 may be formed as one filter component 401. This configuration can minimize the number of wiring branches on a printed circuit board, and thus can suppress reflection of the signal at the wiring branches. Also, by forming the common-mode filter 40 and the diodes 70 to 73 as one filter component 401, the layout area on the printed circuit board can be reduced.

As described above, the signal transmission device includes a first transmission line; a second transmission line; a differential driver; a first single-ended driver; a second single-ended driver; a first diode element; a second diode element; a third diode element; a fourth diode element; and a common-mode filter. An in-phase output terminal of the differential driver and an output terminal of the first single-ended driver are connected to the first transmission line via the first diode element, the third diode element, and the common-mode filter. An antiphase output terminal of the differential driver and an output terminal of the second single-ended driver are connected to the second transmission line via the second diode element, the fourth diode element, and the common-mode filter. The first and third diodes connected in anti-parallel to each other are connected in parallel to the common-mode filter. The second and fourth diodes connected in anti-parallel to each other are connected in parallel to the common-mode filter. A forward-direction threshold voltage of each of the first, second, third, and fourth diodes is higher than a signal amplitude output by the differential driver and lower than a signal amplitude output by the first and second single-ended drivers. Because such a configuration of the signal transmission device is adopted in the second embodiment, unwanted electromagnetic radiation is suppressed and the signal quality can be maintained at a satisfactory level during differential transmission and the signal quality can be maintained at a satisfactory level during single-ended transmission.

Application Examples

Figure 12:
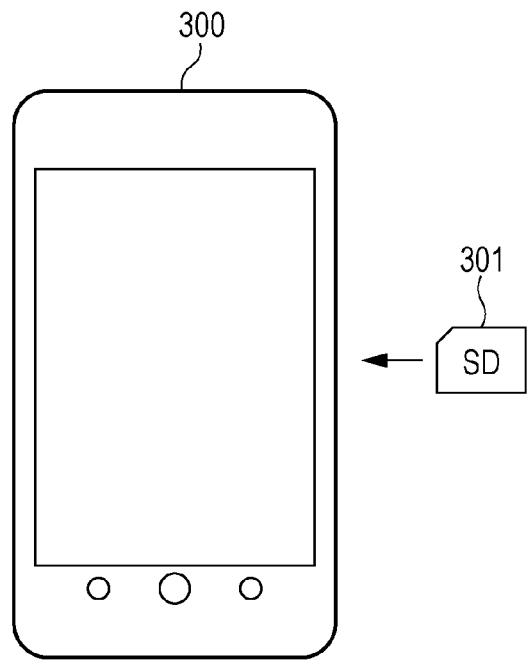
FIG. 12 is a diagram illustrating an external view of a computer device (e.g., a smartphone) which is an application example of the signal transmission device according to the first and second embodiments.

FIG. 12 illustrates an external view of a computer device which is an application example of the signal transmission device 1 according to the first and second embodiments. The computer device illustrated in FIG. 12 is, for example, a smartphone 300. A memory card is inserted into the smartphone 300. The memory card is, for example, an SD card 301.

Figure 13:
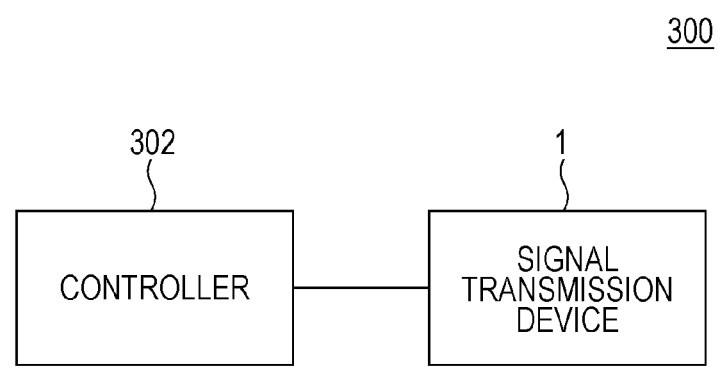
FIG. 13 is a block diagram illustrating an SD card interface portion of the smartphone illustrated in FIG. 12.

FIG. 13 illustrates an SD card interface portion of the smartphone 300 illustrated in FIG. 12. The SD card interface portion includes a controller 302 and the above-described signal transmission device 1. The signal transmission device 1 serves as an interface that exchanges data with the SD card 301. The controller 302 transmits and receives data via the signal transmission device 1. The signal transmission device 1 illustrated in FIG. 13 uses two transmission lines both for transmission of a differential clock signal and transmission of two single-ended data signals.

Examples of the computer device according to an application example of the present disclosure includes a personal computer and a car navigation system as well as mobile devices such as a smartphone and a tablet terminal.

In the case where transmission lines are used both for differential transmission and single-ended transmission and a common-mode filter is included, the signal transmission device according to exemplary embodiments of the present disclosure allows unwanted electromagnetic radiation to be suppressed and the signal quality to be maintained at a satisfactory level during differential transmission and allows the signal quality to be maintained at a satisfactory level during single-ended transmission.

What is claimed is:

1. A signal transmission device comprising:
a first transmission line;
a second transmission line;
a differential driver having an in-phase output terminal and an antiphase output terminal;
a first single-ended driver circuit block having an output terminal;
a second single-ended driver circuit block having an output terminal;
a control circuit; and
a common-mode filter, wherein
the in-phase output terminal of the differential driver and the output terminal of the first single-ended driver circuit block are connected to the first transmission line via the common-mode filter,
the antiphase output terminal of the differential driver and the output terminal of the second single-ended driver circuit block are connected to the second transmission line via the common-mode filter, and
the control circuit controls,
in a case where two-channel single-ended transmission is performed using the first single-ended driver circuit block and the second single-ended driver circuit block,
a driving capability of the first single-ended driver circuit block and a driving capability of the second single-ended driver circuit block
in accordance with a combination of
a change in a logical value of an output signal of the first single-ended driver circuit block and
a change in a logical value of an output signal of the second single-ended driver circuit block.

2. The signal transmission device according to claim 1, wherein
the control circuit makes, in a case (a) where the logical value of the output signal of one single-ended driver circuit block among the first and second single-ended driver circuit blocks changes and the logical value of the output signal of the other single-ended driver circuit block remains unchanged, a driving capability of the one single-ended driver circuit block higher than driving capabilities of the first and second single-ended driver circuit blocks in each of a case (b) where both the logical values of the output signals of the first and second single-ended driver circuit blocks remain unchanged and a case (c) where the logical values of the output signals of the first and second single-ended driver circuit blocks change in opposite directions, and
makes, in a case (d) where the logical values of the output signals of the first and second single-ended driver circuit blocks change in identical directions, driving capabilities of the first and second single-ended driver circuit blocks higher than driving capabilities of the first and second single-ended driver circuit blocks in the case (a).

3. The signal transmission device according to claim 2, wherein
each of the first and second single-ended driver circuit blocks includes a plurality of single-ended drivers having different driving capabilities, and
the control circuit outputs a signal to select one or more single-ended drivers to be driven from among the plurality of single-ended drivers.

4. The signal transmission device according to claim 2, wherein
each of the first and second single-ended driver circuit blocks includes
a single-ended driver having an output terminal, and
a plurality of resistor circuits having different resistance values and connected to the output terminal of the single-ended driver, and
the control circuit outputs a signal to select one or more resistor circuits to be driven from among the plurality of resistor circuits.

5. A signal transmission system comprising:
a master device that is the signal transmission device according to claim 2; and a slave device connected to the master device via the first and second transmission lines, wherein the master device instructs, before two-channel single-ended transmission is performed from the slave device to the master device via the first and second transmission lines, the slave device to control driving capabilities of drivers for respective channels in accordance with a combination of changes in logical values of single-ended signals output to the respective channels by the slave device.

6. A computer device which exchanges data by using the signal transmission device according to claim 2.

7. A signal transmission method for a signal transmission device including a first transmission line, a second transmission line, a differential driver including an in-phase output terminal and an antiphase output terminal, a first single-ended driver circuit block including an output terminal, a second single-ended driver circuit block including an output terminal, a control circuit, and a common-mode filter, the in-phase output terminal of the differential driver and the output terminal of the first single-ended driver circuit block being connected to the first transmission line via the common-mode filter, the antiphase output terminal of the differential driver and the output terminal of the second single-ended driver circuit block being connected to the second transmission line via the common-mode filter, the signal transmission method comprising:

controlling, with the control circuit, a driving capability of the first single-ended driver circuit block and a driving capability of the second single-ended driver circuit block in accordance with a combination of a change in a logical value of an output signal of the first single-ended driver circuit block and a change in a logical value of an output signal of the second single-ended driver circuit block; and performing two-channel single-ended transmission by using the first single-ended driver circuit block and the second single-ended driver circuit block.

* * * * *